(12) United States Patent
Kimura et al.

(10) Patent No.: US 9,620,083 B2
(45) Date of Patent: Apr. 11, 2017

(54) CONTROL DEVICE, INFORMATION PROCESSING APPARATUS AND COMPUTER PROGRAM PRODUCT

(71) Applicant: KABUSHIKI KAISHA TOSHIBA, Minato-ku, Tokyo (JP)

(72) Inventors: Tetsuro Kimura, Tokyo (JP); Tatsunori Kanai, Kanagawa (JP); Takeshi Ishihara, Kanagawa (JP); Junichi Segawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 11 days.

(21) Appl. No.: 14/081,226

(22) Filed: Nov. 15, 2013

(65) Prior Publication Data

US 2014/0139500 A1    May 22, 2014

(30) Foreign Application Priority Data

Nov. 20, 2012    (JP) .................................. 2012-254764

(51) Int. Cl.
*G09G 5/12*    (2006.01)
*G06F 3/14*    (2006.01)

(52) U.S. Cl.
CPC ............. *G09G 5/12* (2013.01); *G06F 3/1415* (2013.01); *G06F 3/1454* (2013.01); *G09G 2370/042* (2013.01); *G09G 2380/14* (2013.01)

(58) Field of Classification Search
CPC ................ G06F 3/1415; G06F 3/1454; G09G 2370/042; G09G 2380/14; G09G 5/12
See application file for complete search history.

(56) References Cited

U.S. PATENT DOCUMENTS 6,072,465 A    6/2000    Maeda et al.
7,660,835 B2    2/2010    Hayashi et al.
(Continued)

FOREIGN PATENT DOCUMENTS

JP    10-105274    4/1998
JP    2007-233099    9/2007
(Continued)

OTHER PUBLICATIONS

Machine translation of JP 2007-241457.*
(Continued)

*Primary Examiner* — Michael Pervan
(74) *Attorney, Agent, or Firm* — Amin, Turocy & Watson LLP

(57) ABSTRACT

According to an embodiment, a control device includes a detection unit, a process control unit, and an acquisition unit. The detection unit is configured to detect attachment and detachment of a display device including an electronic paper. The process control unit is configured to write identification information for the display device and process information in association with each other in a storage unit when detachment of the display device is detected. The process information indicates a state of a process for processing content to be displayed on the display device. The acquisition unit is configured to acquire the identification information when attachment of the display device is detected. The process control unit acquires the process information associated with the acquired identification information and causes the process to be in an execution state at a time of detachment of the display device, based on the acquired process information.

12 Claims, 6 Drawing Sheets

(56) References Cited

U.S. PATENT DOCUMENTS

| 8,068,098 B2 | 11/2011 | Yoshida |
| 2007/0208785 A1 | 9/2007 | Hayashi et al. |
| 2007/0283248 A1 | 12/2007 | Yoshida |

FOREIGN PATENT DOCUMENTS

| JP | 2007-241456 | 9/2007 |
| JP | 2007-241457 | 9/2007 |
| JP | 2007-323365 | 12/2007 |
| JP | 2011-064733 | 3/2011 |
| TW | 200741642 | 11/2007 |
| TW | 201137736 | 11/2011 |

OTHER PUBLICATIONS

Taiwanese Office Action for Taiwanese Patent Application No. 102142125 mailed Jul. 23, 2015.
Chinese Office Action for Chinese Patent Application No. 201310585386.2 mailed Mar. 3, 2016.
Japanese Office Action for Japanese Patent Application No. 2012-254764 mailed on May 10, 2016. Translated to English by EPO Global Dossier on Jun. 15, 2016.

* cited by examiner

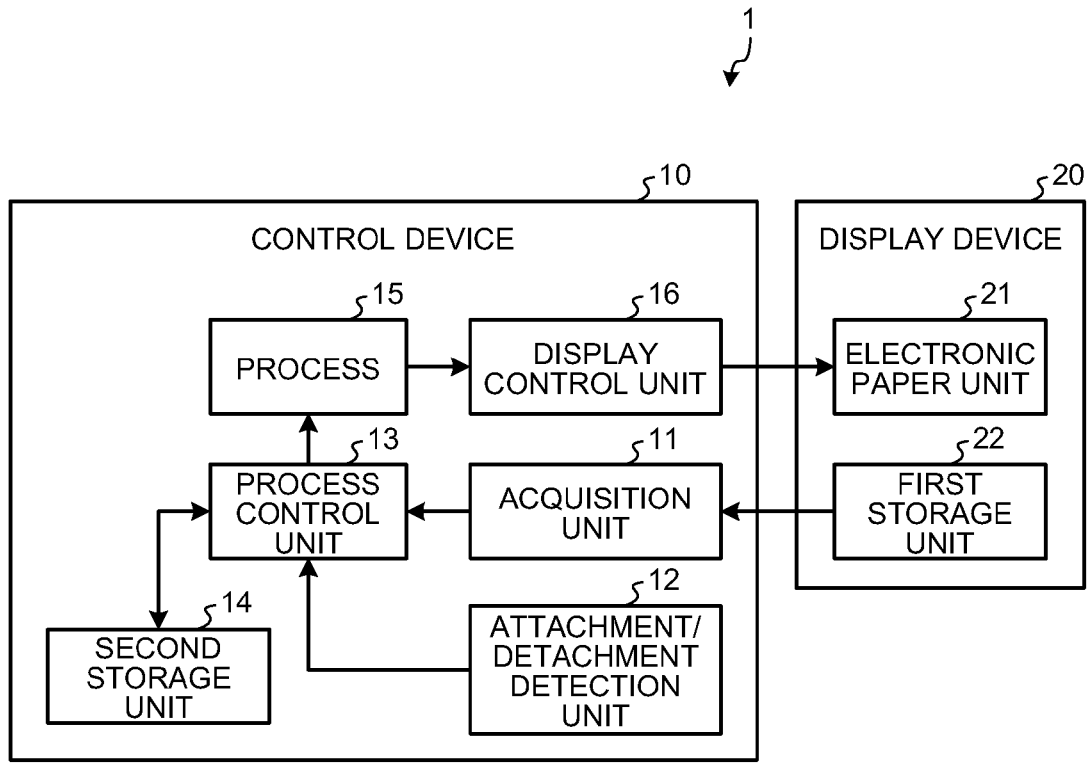

FIG.3

| DEVICE ID | PROCESS ID |
|---|---|
| 0x9B4F23AE | 6912 |
| 0x12A30F92 | 7134 |
| 0x3BF2AD7C | 7156 |
| ... | ... |

| PROCESS ID | DISPLAY INFORMATION |
|---|---|
| 6912 | PROCESS INFORMATION OF APPLICATION 1 (PROGRAM COUNTER, VARIOUS REGISTERS, CONTENT OF MAIN STORAGE) |
| 7134 | PROCESS INFORMATION OF APPLICATION 2 (PROGRAM COUNTER, VARIOUS REGISTERS, CONTENT OF MAIN STORAGE) |
| 7156 | PROCESS INFORMATION OF APPLICATION 3 (PROGRAM COUNTER, VARIOUS REGISTERS, CONTENT OF MAIN STORAGE) |
| ... | ... |

FIG.4

| DEVICE ID | PROCESS ID |
|---|---|
| 0x9B4F23AE | 6912 |
| 0x12A30F92 | 7134 |
| 0x3BF2AD7C | 7156 |
| 0x4504D7F6 | -1 |
| 0xA434D453 | -1 |
| ... | ... |

FIG.6A

| DEVICE ID | PROCESS ID |
|---|---|
| 0x9B4F23AE | 6912 |
| 0x12A30F92 | 7134 |
| 0x3BF2AD7C | 7156 |
| 0x4504D7F6 | 6912 |
| ... | ... |

EXAMPLE OF ONE-TO-MANY

| PROCESS ID | DISPLAY INFORMATION |
|---|---|
| 6912 | PROCESS INFORMATION OF APPLICATION 1 (PROGRAM COUNTER, VARIOUS REGISTERS, CONTENT OF MAIN STORAGE) |
| 7134 | PROCESS INFORMATION OF APPLICATION 2 (PROGRAM COUNTER, VARIOUS REGISTERS, CONTENT OF MAIN STORAGE) |
| 7156 | PROCESS INFORMATION OF APPLICATION 3 (PROGRAM COUNTER, VARIOUS REGISTERS, CONTENT OF MAIN STORAGE) |
| ... | ... |

FIG.6B

EXAMPLE OF ONE-TO-MANY

| PROCESS ID | DEVICE ID | DEVICE ID | DEVICE ID |
|---|---|---|---|
| 6912 | 0x9B4F23AE | 0x4504D7F6 | ... |
| 7134 | 0x12A30F92 | | |
| 7156 | 0x3BF2AD7C | | |
| ... | ... | | |

FIG.7A

| DEVICE ID | DISPLAY INFORMATION |
|---|---|
| 0x9B4F23AE | ALL OF P2 |
| 0x4504D7F6 | ALL OF P4 |
| 0x12A30F92 | P7, LINE 3, SCALE FACTOR 150% |
| ... | ... |

FIG.7B

| DEVICE ID | DISPLAY INFORMATION |
|---|---|
| 0x9B4F23AE | SHEET 2, CENTER COORDINATES (20, 100), SCALE FACTOR 100% |
| 0x4504D7F6 | SHEET 8, CENTER COORDINATES (0, 0), SCALE FACTOR 50% |
| ... | ... |

FIG.7C

| DEVICE ID | DISPLAY INFORMATION |
|---|---|
| 0x9B4F23AE | URL=http://www.toshiba.co.jp/, DISPLAY POSITION=top |
| 0x4504D7F6 | URL=http://www.xxx.yy/, DISPLAY POSITION= bottom |
| ... | ... |

FIG.8A

| | DEVICE ID | DISPLAY INFORMATION |
|---|---|---|
| PRESENCE/ABSENCE OF DISPLAY INFORMATION UPDATE | 0x9B4F23AE | ALL OF P2 |
| PRESENT | 0x4504D7F6 | ALL OF P4 |
| | 0x12A30F92 | P7, LINE 3, SCALE FACTOR 150% |

FIG.8B

| DEVICE ID | PRESENCE/ABSENCE OF DISPLAY INFORMATION UPDATE | DISPLAY INFORMATION |
|---|---|---|
| 0x9B4F23AE | ABSENT | ALL OF P2 |
| 0x4504D7F6 | PRESENT | ALL OF P4 |
| 0x12A30F92 | PRESENT | P7, LINE 3, SCALE FACTOR 150% |

FIG.8C

| | DEVICE ID | DISPLAY INFORMATION |
|---|---|---|
| DISPLAY INFORMATION UPDATE | 0x9B4F23AE | ALL OF P2 |
| P3 AND LATER | 0x4504D7F6 | ALL OF P4 |
| | 0x12A30F92 | P7, LINE 3, SCALE FACTOR 150% |

CONTROL DEVICE, INFORMATION PROCESSING APPARATUS AND COMPUTER PROGRAM PRODUCT

CROSS-REFERENCE TO RELATED APPLICATION

This application is based upon and claims the benefit of priority from Japanese Patent Application No. 2012-254764, filed on Nov. 20, 2012; the entire contents of which are incorporated herein by reference.

FIELD

Embodiments described herein relate generally to a control device, an information processing apparatus and computer program product.

BACKGROUND

Conventionally, there is proposed an information processing apparatus capable of using an attachable/detachable electronic paper as a display device. According to the information processing apparatus, it is possible to switch between a plurality of electronic papers, and a displayed screen continues to be displayed on each electronic paper even after it is detached from the information processing apparatus. Also, text or the like can be directly written on the electronic paper using a pen tablet or the like.

However, in the case of attaching/detaching a plurality of electronic papers, when attaching an electronic paper, which was detached, again to an information processing apparatus, if another electronic paper was attached in the meantime and a work was performed, the processing status of the attached electronic paper may become hard to grasp. In this case, a screen displayed on the electronic paper and a screen which is recognized as being worked on at the information processing apparatus are not consistent with each other, and a process is possibly disrupted.

BRIEF DESCRIPTION OF THE DRAWINGS

FIG. 1 is a functional block diagram of an information processing apparatus of a first embodiment;

FIG. 2 is a diagram illustrating a data structure of a process/device correspondence storage unit of the first embodiment;

FIG. 3 is a diagram illustrating a data structure of the process/device correspondence storage unit of the first embodiment;

FIG. 4 is a diagram illustrating a data structure of the process/device correspondence storage unit of the first embodiment;

FIG. 6A is a diagram illustrating a data structure of a process/device correspondence storage unit of the second embodiment;

FIG. 6B is a diagram illustrating a data structure of the process/device correspondence storage unit of the second embodiment;

FIG. 7A is a diagram illustrating a data structure of a device content storage unit of the second embodiment;

FIG. 7B is a diagram illustrating a data structure of the device content storage unit of the second embodiment;

FIG. 7C is a diagram illustrating a data structure of the device content storage unit of the second embodiment;

FIG. 8A is a diagram illustrating a data structure of the device content storage unit of the second embodiment;

FIG. 8B is a diagram illustrating a data structure of the device content storage unit of the second embodiment; and FIG. 8C is a diagram illustrating a data structure of the device content storage unit of the second embodiment.

DETAILED DESCRIPTION

Figure 5:
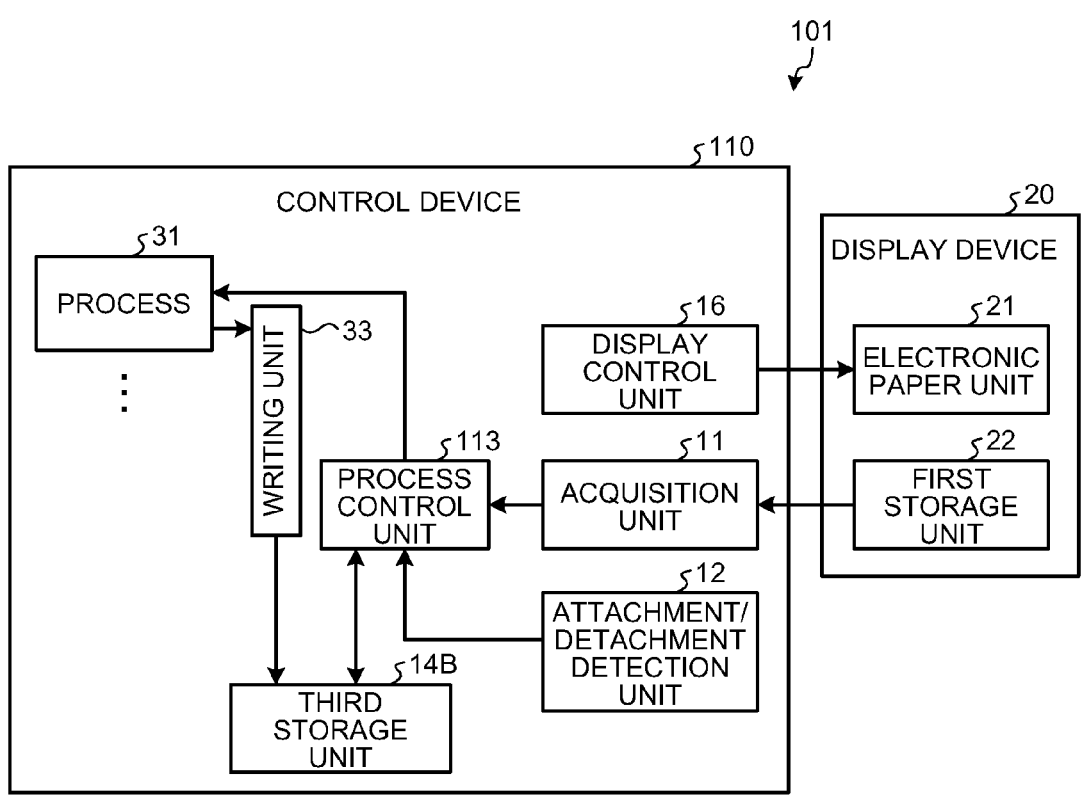
FIG. 5 is a functional block diagram of an information processing apparatus of a second embodiment.

According to an embodiment, a control device includes a detection unit, a process control unit, and an acquisition unit. The detection unit is configured to detect attachment and detachment of a display device including an electronic paper. The process control unit is configured to write identification information assigned to the display device and process information in association with each other in a storage unit when detachment of the display device is detected. The process information indicates a state of a process for processing content to be displayed on the display device. The acquisition unit is configured to acquire the identification information when attachment of the display device is detected. The process control unit acquires the process information based on the acquired identification information, and causes the process to be in an execution state at a time of detachment of the display device, based on the acquired process information.

Hereinafter, examples of information processing apparatuses employing embodiments of the present invention will be described in detail with reference to the drawings. Additionally, the present invention is not limited by these example embodiments.

First Embodiment

FIG. 1 is a functional block diagram of an information processing apparatus of a present embodiment. As illustrated in FIG. 1, an information processing apparatus 1 includes a control device 10 and a display device 20. The control device 10 includes an acquisition unit 11 (an acquisition unit), an attachment/detachment detection unit 12 (a detection unit), a process control unit 13, a second storage unit 14, a process 15, and a display control unit 16. Additionally, the control device 10 is configured from a CPU, a main storage including ROM, RAM and the like, and hardware such as a power source and the like.

The display device 20 is connected to the control device 10. The display device 20 includes an electronic paper unit 21 and a first storage unit 22. The electronic paper unit 21 is a display recording medium allowing rewriting of an image, and capable of saving the display of an image in a state where there is no power. The electronic paper unit 21 may be installed using various existing methods such as an electrophoresis method, a quick-response liquid power method, a liquid crystal method and the like. The first storage unit 22 stores a device ID which is identification information unique to the electronic paper unit 21. Each of unique identifiers is stored in the display device 20 at the time of shipping, for example.

Additionally, the processes 15 of a plurality of applications may operate on the control device 10, but the number of applications that can be output on a screen is one, and a multi-window method by which a plurality of applications output windows on the screen at the same is not allowed. Accordingly, when a process of an application is being output to the electronic paper unit 21, the electronic paper unit 21 that is connected and the process of the application are in a relationship of one to one.

The acquisition unit 11 reads out the unique device ID of the display device 20 connected to the control device 10. The method of reading out may be a method of directly electrically reading out from the connected display device 20, or a method of reading out in a non-contact manner, such as RFID or the like. The acquisition unit 11 transmits the device ID which has been read out to the process control unit 13.

The attachment/detachment detection unit 12 detects connection and detachment of the display device 20 to and from the control device 10. That is a change in the connection relationship between the control device 10 and the display device 20 is detected. Moreover, with respect to the method of detecting connection and detachment of the display device 20 to and from the control device 10 (a change in the connection relationship), whether or not the devices are directly electrically connected may be detected, or a change in a mechanical state of a latch or the like may be detected, or a user may specifically notify of the connection and separation using a button or the like.

The process control unit 13 newly starts a process or stops a process currently operating at the time of activating a new application, resumes a process in a stopped state, or stops a process currently operating. The process 15 refers to an entity of a program (an application program), and every time the process 15 is activated, it is started on an OS, for example, but the OS is not restrictive. The process 15 performs the actual information processing.

The second storage unit 14 stores in association with each other the process 15 for outputting a screen on the display device 20 connected to the control device 10 (the entity of an application currently executed) and the display device 20. Specifically, information indicating the state of a current process and the ID information of a display device (the device ID) are stored in association with each other. FIG. 2 is a diagram illustrating a record of each correspondence relationship stored in the second storage unit 14. A device ID and process information are stored as one record in the second storage unit 14 in a one-to-one manner. The timing of storing the record is the timing of activation of an application or the timing of detachment of the display device 20, for example, and the device ID of the display device 20 that is attached and the process information managed by the process control unit 13 are stored at each timing in association with each other. For example, values of a program counter or a register, contents of a main device and the like correspond to the process information.

The display control unit 16 rewrites the contents of the electronic paper unit 21 that is connected to the control device 10, according to a screen output request from a process.

Next, an operation of the control device 10 of the present embodiment will be described. When a user detaches the display device 20 from the control device 10, the attachment/detachment detection unit 12 detects cutoff of connection to the display device 20 (detachment of the display device 20). Then, the attachment/detachment detection unit 12 notifies the process control unit 13 of the cutoff of the display device 20 (the detachment of the display device 20). The process control unit 13 stops the process 15 of the application corresponding to the display device 20, and stores, in the second storage unit 14, information necessary for resuming the process 15 of the application, i.e. values of a program counter and various registers, contents of a main storage, and the like, in association with the device ID.

Next, an operation at the time of attachment will be described. When a user attaches the display device 20 to the control device 10, the attachment/detachment detection unit 12 detects the connection of the display device 20, and notifies the process control unit 13 of the connection of the display device 20. The process control unit 13 reads out the device ID of the display device 20 via the acquisition unit 11. The process control unit 13 searches the second storage unit 14 with the acquired device ID as a key, and resumes the process associated with the display device 20. The process control unit 13 uses information of process saved, at the time of resumption.

According to the control device 10 of the present embodiment described above, at the time of detachment of the display device 20, the ID of the device and the process information are stored in association with each other, and thus at the time of reconnection of the display device 20, an appropriate process may be selected based on the device ID and be resumed. Accordingly, the consistency of the processes may be achieved between the control device 10 and the display device 20.

Additionally, with an OS such as Linux (registered trademark), to realize stop and resumption of a process, a signal SIGSTOP is transmitted to the process at the time of stopping the process, and a signal SIGCONT is transmitted at the time of resuming the process which has been stopped. Therefore, to configure a process/device correspondence storage unit on Linux, a combination of a process ID and a device ID of a display device is stored, as illustrated in FIG. 3.

The second storage unit 14 is for storing correspondence between a process which was performing display and the display device 20 while the display device 20 is detached. Accordingly, while the display device 20 is connected and a user is operating the control device 10, the correspondence between the ID of the process that is being executed and the device ID of the display device may be managed by the second storage unit 14 or the correspondence may be deleted.

Also, in the case of managing the correspondence between the device ID and the process while the display device 20 is connected, when a user ends a process of an application while the device is connected and starts a process of another application, correspondence information of the device ID registered in the second storage unit 14 is updated to information of another process.

Furthermore, in the case the display device 20 is detached while a home screen (a startup screen) where no process 15 is being executed is being displayed, there is no need to associate the home screen and the display device 20 in a one-to-one manner, and a plurality of display devices 20 may be associated with the home screen. For example, when first using the control device 10, although there are a plurality of display devices 20, it is possible that no process 15 has yet been started, and thus it is preferable that the home screen is displayed by the connection of whichever display device 20 to allow operation of a menu or the like.

Accordingly, in the case the display device 20 is detached in a state of the home screen or the like where there is no specific activated process 15, if there is a process displaying the home screen, its process ID may be associated as the process information, and be stored in the second storage unit 14. Also, a virtual non-existent process ID (for example, −1) may be associated, instead of a specific process ID, and be stored in the second storage unit 14. In either case, the device IDs of a plurality of display devices 20 are associated with the process ID in a many-to-one relationship, as illustrated in FIG. 4. In the case the process ID −1 is acquired when reading out the process information associated with the connected device ID from the second storage unit 14, the process control unit 13 activates the process for displaying the home screen.

Next, a case where there is no record of a process associated with the device ID of the display device 20 in the second storage unit 14 at the time of connection of the display device 20 to the control device 10 will be described.

In this case, there may be assumed a case where the connected display device 20 is connected to the control device 10 for the first time, and a case where the display device 20 which was connected with another control device 10 is connected. Since the control device 10 itself cannot distinguish between these cases, the control device 10 inquires of a user whether connection to the control device 10 as a new display device 20 is allowed or not. This inquiry is performed being displayed by an LED lamp provided to the control device 10, a display capable of displaying a message, or the like, and a user inputs a response with respect to whether it is allowed or not using a button, a touch panel or the like. Then, in the case the user inputs that connection as a new display device 20 is to be performed, the home screen is displayed. On the other hand, in the case the user inputs that connection as a new display device 20 is not to be performed, screen display or the like is not performed.

Second Embodiment

Next, an information processing apparatus of a second embodiment will be described. A case where one display device 20 is associated with one application is described in the first embodiment, and sharing of a process of one application by a plurality of display devices is not considered. In the present embodiment, a process of a certain application is shared by a plurality of display devices, and the same content (display content) is displayed by different display devices. A detailed configuration will be described below using FIG. 5, which is a functional block diagram of a control device 110 included in an information processing apparatus 101.

As illustrated in FIG. 5, according to the control device 110, a process control unit 113 controls a plurality of processes 31.

A third storage unit 14B includes a first region and a second region. The first region stores process information and a device ID in association with each other. The first region may also store device IDs of a plurality of display devices 20 in association with one process. That is, the process control unit 113 is capable of writing in the first region one piece of process information and a plurality of pieces of identification information in association with one another. Specifically, as illustrated in FIGS. 6A and 6B, the first region stores a record in such a way that device IDs of a plurality of display devices 20 are associated with one process. The second region stores displayed contents information and a device ID in association with each other.

In the above, the first region and the second region are arranged on the same third storage unit 14B (the same storage device), but the storage device where the first region is arranged and the storage device where the second region is arranged may be different.

Also, examples of formats of information stored in the second region are described using FIGS. 7A to 7C. Information necessary for an application to identify the content displayed by the display device 20 is different for each application, and thus, the data structure is dependent on the design of the application. For example, FIG. 7A illustrates an example of a document on a per page basis of an application that handles text-based information, and the second region stores correspondence between a device ID and information, as displayed contents information, about the page number, the scale factor and the like. Information in which the display device 20 which has been detached last and displayed contents information are associated is linked with order information (information indicating the last detachment). For example, in FIG. 7A, the order of rows in the table is such that the information associating the display device 20 which has been detached last and the displayed contents information is written at the top or at the bottom. Here, the information (the row) associating the display device 20 which has been detached last (the device ID) and the displayed contents information is written at the top or at the bottom, but this is not restrictive, and, for example, a flag may be attached to the information associating the display device 20 which has been detached last and the displayed contents information, or the row number of the information associating the display device 20 which has been detached last and the displayed contents information may be separately stored. The same thing can be said for FIGS. 7B, 7C, 8A, 8B, and 8C.

Furthermore, FIG. 7B is an example of information handled by an application for drawing shapes or the like, and the second region stores correspondence between a device ID and information, as the displayed contents information, about the sheet number, the center coordinates, the scale factor, and the like. Also, FIG. 7C is a case of an application such as a Web browser, and the second region stores correspondence between a device ID and information, as the displayed contents information, about the URL of a page that is displayed, the display position in the page, and the like.

In the following, a flow of managing the display device 20 in each process of the present embodiment will be described. A user first operates, in a state where a first display device 20 (hereinafter referred to as a "first display device") is attached, an operation interface showing a description "share content with other display devices", for example, and issues a notification to the process control unit 113 (a reception unit). The process control unit 113, which has received the notification, registers the correspondence relationship between the process 31 and the first display device 20 in the second storage unit 14. Then, the process control unit 113 issues a notification regarding content saving to the process 31. The process 31, which has received the notification, saves, in the second region, the device ID of the display device that is currently connected and information for identifying the content displayed by the first display device. Then, the process control unit 113 stops the process 31. Additionally, the order of saving in the third storage unit 14B and saving in the second region is not fixed.

Next, when the user detaches the first display device 20 and attaches a display device 20 different from the first display device 20 (hereinafter referred to as a "second display device"), the attachment/detachment detection unit 12 detects, and notifies to the process control unit 113, the attachment of the display device. The process control unit 113 refers to the third storage unit 14B, checks that the second display device 20 is not associated with the process ID of a process that is actually currently operating, that is, it is given a value "−1", and notifies the process 31 of attachment of a new display device 20. The process 31, which has received this notification, draws a screen on the display device 20.

With respect to the screen to be drawn, content same as that which was displayed at the time of detachment of the first display device 20 may be acquired from the second region and be displayed, for example. Or, the next screen, for example, page four in the case where page three was displayed on the first display device 20, may be displayed, or the home screen may be displayed. Additionally, the process 31 may be stopped or may operate during the time from the detachment of the first display device 20 to the attachment of the second display device 20.

Also, in the case the second display device 20 that is attached is already stored in association with the process ID of a process that is operating, the associated process may be called up, or a message "inherit content", for example, may be sent to the user. In the case inheritance of content is selected by the user, the screen corresponding to the first display device 20 is displayed on the second display device 20, and in the case inheritance is not selected, the screen of a process associated with the second display device 20 is displayed.

With the method described above, when the first display device 20 is attached, the content is reflected in another display device 20 according to an instruction from a user, but a configuration is also possible where an instruction is issued such that the display screen is reflected at the time of newly attaching the second display device 20.

That is, first, the first display device 20 is detached from the control device 110 in a state where the process 31 and the display device 20 are associated in a one-to-one manner and stored in the third storage unit 14B. At this time, the process 31 stores the correspondence relationship between the process 31 and the first display device 20 in the first region.

Then, when the second display device 20 is attached, the home screen or a menu screen is displayed after it is checked that the second display device 20 is not associated with the process ID of a process currently operating. At this time, a list of processes allowing screen connection is displayed on the second display device 20, and when a user selects one from the list, the second display device 20 is connected to the selected process as the new display device, and the same content as the first display device 20 is displayed, or the content of the next page is displayed, for example.

In this case, the second display device 20 is not directly connected to the process 31 after the connection, and a method is adopted where a menu screen is displayed after the second display device 20 is connected, and a process for screen connection is selected by the user.

Furthermore, as another method of installation, a method is also possible of selecting a menu for display on the second display device 20 from a menu at the time of selecting a link of a Web page while the Web page is being displayed by a Web browser on the first display device 20. In this case, after selecting a menu at the first display device 20, the first display device 20 is detached, and the second display device 20 is connected. Then, at the time of attachment of the second display device 20, a page indicated as the destination by the link is displayed on the second display device 20.

With the control device 110 of the present embodiment described above, the content displayed on the first display device 20 may be transferred to the second display device 20 through the second region. Thus, the same or related display, as the first display device 20, may be performed at the second display device 20, and the convenience of a user may be increased even in a case where use of a plurality of display devices in parallel is desired.

Next, an operation for a case where the first display device 20 is separated in a state where the process 31 is connected to the first display device 20 and is operating, and the second display device 20 is then attached will be described.

When a user detaches the first display device 20 from the control device 110, the attachment/detachment detection unit 12 detects cutoff of connection to the first display device 20 (detachment of the display device 20). Then, the attachment/detachment detection unit 12 notifies the process control unit 113 of the cutoff (detachment) of the first display device 20. The process control unit 113 transmits a request for saving displayed contents information to a process by means such as a signal or interruption. The process 31 which has received this request notifies a writing unit 33 of the device ID of the display device 20 that is currently connected to the control device 110, and displayed contents information for identifying the content displayed on the first display device 20 (for example, the page number, the scale factor and the like). Then, the writing unit 33 performs saving in the third storage unit 14B. Next, the process control unit 113 stops the process 31, and writes information that is necessary at the time of resuming the process 31 in the third storage unit 14B. That is, the process control unit 113 stores, in the third storage unit 14B, the values of a program counter and various registers, the content of a main storage, and the like, in association with the device ID.

Next, an operation at the time of attaching, to the control device 110, a second display device 20 different from a first display device 20 which was the output destination until the process 31 was stopped will be described. The attachment/detachment detection unit 12 detects the connection of the display device 20, and notifies the process control unit 113 of the connection of the display device 20. The process control unit 113 reads out the device ID of the display device 20 via the acquisition unit 11. The process control unit 113 searches the third storage unit 14B with the acquired device ID as the key, and resumes the operation of the process associated with the second display device 20. That is, the process control unit 113 causes the process to be in an execution state at the time of detachment of the display device 20, based on process information acquired. The process control unit 113 uses the information about the process which was saved, at the time of resumption.

The process 31 which has resumed the operation inquires of the acquisition unit 11, and acquires the device ID of the display device 20 connected. The third storage unit 14B is searched through with the device ID obtained as the key, displayed contents information corresponding to the content displayed on the second display device 20 is acquired, and a current display position managed by the process 31 is corrected to a display position acquired. That is, in the case the acquired identification information is different from the identification information of the display device 20 which was detached last from the process in the execution state, the process in the execution state acquires displayed contents information associated with the acquired identification information from the second storage unit 14B, and causes the internal state of the process to match the displayed contents information. Whether the display device 20 is one that was detached last from the process in the execution state is determined based on order information (information indicating the last detachment) linked to the information associating the display device 20 detached last and the displayed contents information.

Since this correction operation is different for each application, the concrete operation is dependent on the design of the application. For example, in the case of a word processor, the displayed contents information in FIG. 7A is acquired, and the internal state of the application is changed so as to match information about the page position displayed on the second display device that is attached, the scale factor, information about the cursor position, and the like.

The process 31 can identify what is displayed already on the second display device 20 that is attached based on the information stored in the third storage unit 14B, and thus, can correctly interpret the content of operation performed by a user on the screen without drawing the screen again. For example, when the user points (using a touch panel, a mouse or the like) to one portion on the screen, whether what is arranged there is text, a button or a Web link can be determined, and the application can immediately operate according to the content. Also, for example, when inputting text by a word processor using a keyboard or the like, the position of a cursor displayed on the display device at the time of attachment can be identified, and thus, text can be inserted at a right position.

Moreover, the embodiment described above may be carried out as an example modification described below. In an example modification, a case is assumed where a word processor is used as an example of the application, and its process is associated with a first display device 20 and a second display device 20. A case is considered where the first display device 20 displays all of page five of a document, and the second display device 20 displays all of page three. It is assumed that the second display device 20 is connected to the control device 110 in this state and a user performs correction of inserting text amounting to ten lines on page three. With respect to the part following the inserted portion of the document, the arrangement of text on each page will be shifted by ten lines due to this correction.

In this case, the first display device 20 is detached from the control device 110 and the content cannot be updated while the second display device 20 is connected and is being edited. Therefore, when the first display device 20 is attached at a later time, the content displayed on the display device 20 and the content that may be identified based on the information recorded in the second region are possibly deviated from each other.

Thus, the second region may further include, in association with each process, a flag indicating whether content has been updated or not. When a process is operated while being connected to one display device in a situation where a plurality of display devices 20 are connected to one process, and then, processing that affects the content of a display device that is not connected is performed, the process control unit 113 performs processing of setting the flag. Then, in a case the flag is set when another display device 20 is connected, the display control unit 16 generates a screen in a latest state instead of using the data of content that is associated with the display device 20 as it is.

Additionally, one flag indicating whether content has been updated or not may be provided for one process, as illustrated in FIG. 8A. Or, as illustrated in FIG. 8B, it may be prepared for each device ID of the display device in a one-to-one manner. In this case, a column for recording presence/absence of update is provided for each device ID in the second region, for example. When processing that affects the content of a display device that is not connected is performed as a result of the process 31 operating, the process control unit 113 determines whether the content of a display device 20 is to be affected, and sets a flag indicating presence/absence of update for a device ID with screen content which would be affected. For example, in the case the page where update is performed is page four, a display device 20 that displays a page before page four is not affected, but a display device 20 that displays a page after page four is affected, and thus, the flag is set. Moreover, the flag may be set for all the device IDs for displaying the same document regardless of whether there is an actual influence or not.

Also, as illustrated in FIG. 8C, whether content has been updated or not does not have to be registered as a flag in a binary form, and instead, the range of change may be registered. In this case, the process control unit 113 may determine whether the screen has been updated or not, at the time of attachment of the display device 20, based on the content of the display device 20 and the information about the range to be affected. Or, only the changed position is recorded instead of recording the range to be affected by the change, and identification of the range to be affected by the change and determination of whether the screen has been updated or not may be performed at the time of attachment of the display device 20.

Furthermore, each program to be executed by the control devices 10 and 110 of the present embodiment may be provided as a computer program product by being recorded in a computer-readable recording medium, such as a CD-ROM (Compact Disk Read Only Memory), a FD (flexible disk), a CD-R (Compact Disk Recordable), or a DVD (Digital Versatile Disk), in the form of an installable or executable file.

Moreover, each program to be executed by the control devices 10 and 110 of the embodiments may be stored on a computer connected to a network such as the Internet, and be provided by being downloaded via the network. Also, each program to be executed by the control devices 10 and 110 of the embodiments may be provided or distributed via a network such as the Internet.

Also, each program to be executed by the control devices 10 and 110 of the embodiments may be provided, being embedded in a ROM or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device, to which a display device is attachable, the display device having an electronic paper, which rewrites displayed contents information according to a requirement from a process, comprising:
    a detection unit configured to detect attachment and detachment of the display device;
    a process control unit configured to stop the process in an execution state, and write identification information assigned to the display device and process information indicating a state of the process in association with each other in a storage unit when detachment of the display device is detected; and
    an acquisition unit configured to acquire the identification information when attachment of the display device is detected,
    wherein the process control unit acquires the process information associated with the identification information acquired from the storage unit based on the acquired identification information, and causes the process to be in an execution state at a time of detachment of the display device, based on the acquired process information.

2. The control device according to claim 1, wherein when the identification information of the attached display device is not stored in the storage unit in association with the process information, the process control unit causes the display device to display a screen, from which a new process is selectable.

3. The control device according to claim 1, further comprising:
a writing unit configured to write, in the storage unit, the identification information assigned to the display device and displayed contents information output on the display device by the process in association with each other when detachment of the display device is detected, wherein
the process control unit acquires the process information associated with the identification information acquired by the acquisition unit from the storage unit,
causes the process to be in an execution state based on the process information acquired by the acquisition unit, and
when the acquired identification information is different from the latest identification information of the display device for the process in the execution state, the process in the execution state acquires the displayed contents information associated with the acquired identification information from the storage unit, and changes an internal state of the process to match the acquired displayed contents information.

4. The control device according to claim 3, wherein
the process control unit is configured to write one piece of the process information and pieces of the identification information in association with each other in the storage unit;
when a first display device among a plurality of display devices associated with the process is attached and an update, that would affect the displayed contents information of a second display device that is not attached among the display devices, is performed, the storage unit stores a flag indicating that there is an update to the displayed contents information associated with the second display device, and
when attachment of the second display device is detected and the flag is set in the displayed contents information associated with the identification information acquired by the acquisition unit, the process control unit updates the displayed contents information, and causes the corresponding display device to display the updated displayed contents information.

5. An information processing apparatus comprising a control device and a display device, wherein
the display device includes
an electronic paper unit configured to rewrite displayed contents information according to a requirement from a process executed by the control device, and
the control device includes
a detection unit configured to detect attachment and detachment of the display device,
a process control unit configured to stop the process in an execution state and write identification information assigned to the display device and process information indicating a state of the process in association with each other in a storage unit when detachment of the display device is detected, and
an acquisition unit configured to acquire the identification information when attachment of the display device is detected, and
the process control unit acquires the process information associated with the identification information acquired from the storage unit based on the acquired identification information, and causes the process to be in an execution state at a time of detachment of the display device, based on the acquired process information.

6. The information processing apparatus according to claim 5, wherein when the identification information of the attached display device is not stored in the storage unit in association with the process information, the process control unit causes the display device to display a screen, from which a new process is selectable.

7. The information processing apparatus according to claim 5, the control device further includes,
a writing unit configured to write, in the storage unit, the identification information assigned to the display device and displayed contents information output on the display device by the process when detachment of the display device is detected, wherein
the process control unit acquires the process information associated with the identification information acquired by the acquisition unit from the storage unit,
causes the process to be in an execution state based on the process information acquired by the acquisition unit, and
when the acquired identification information is different from the latest identification information of the display device for the process in the execution state, the process in the execution state acquires the displayed contents information associated with the acquired identification information from the storage unit, and changes an internal state of the process to match the acquired displayed contents information.

8. The information processing apparatus according to claim 7, wherein
the process control unit is configured to write one piece of the process information and pieces of the identification information in association with each other in the storage unit;
when a first display device among a plurality of display devices associated with the process is attached and an update, that would affect the displayed contents information of a second display device that is not attached among the display devices, is performed, the storage unit stores a flag indicating that there is an update to the displayed contents information associated with the second display device, and
when attachment of the second display device is detected and the flag is set in the displayed contents information associated with the identification information acquired by the acquisition unit, the process control unit updates the displayed contents information, and causes the corresponding display device to display the updated displayed contents information.

9. A computer program product comprising a non-transitory computer-readable medium containing a computer program that causes a computer to function as:
a detection unit configured to detect attachment and detachment of the display device;
a process control unit configured to stop the process in an execution state, and write identification information assigned to the display device and process information indicating a state of the process in association with each other in a storage unit when detachment of the display device is detected; and an acquisition unit configured to acquire the identification information when attachment of the display device is detected, wherein the process control unit acquires the process information associated with the identification information acquired from the storage unit based on the acquired identification information, and causes the process to be in an execution state at a time of detachment of the display device, based on the acquired process information.

10. The computer program product according to claim 9, wherein when the identification information of the attached display device is not stored in the storage unit in association with the process information, the process control unit causes the display device to display a screen, from which a new process is selectable.

11. The computer program product according to claim 9, further causes the computer to function as:

a writing unit configured to write, in the storage unit, the identification information assigned to the display device and displayed contents information output on the display device by the process in association with each other when detachment of the display device is detected, wherein the process control unit acquires the process information associated with the identification information acquired by the acquisition unit from the storage unit, causes the process to be in an execution state based on the process information acquired by the acquisition unit, and when the acquired identification information is different from the latest identification information of the display device for the process in the execution state, the process in the execution state acquires the displayed contents information associated with the acquired identification information from the storage unit, and changes an internal state of the process to match the acquired displayed contents information.

12. The computer program product according to claim 11, wherein the process control unit is configured to write one piece of the process information and pieces of the identification information in association with each other in the storage unit;

when a first display device among a plurality of display devices associated with the process is attached and an update, that would affect the displayed contents information of a second display device that is not attached among the display devices, is performed, the storage unit stores a flag indicating that there is an update to the displayed contents information associated with the second display device, and when attachment of the second display device is detected and the flag is set in the displayed contents information associated with the identification information acquired by the acquisition unit, the process control unit updates the displayed contents information, and causes the corresponding display device to display the updated displayed contents information.

* * * * *